United States Patent Office 3,461,743
Patented Aug. 19, 1969

3,461,743
METHODS AND APPARATUS FOR REVERSING THE DIRECTION OF ROTATION OF ENGINE OUTPUT SHAFTS
Edmond Henry-Biabaud, Paris, France, assignor to Societe Anonyme Andre Citroen, Paris, France, a French society
Filed July 14, 1967, Ser. No. 653,464
Claims priority, application France, July 21, 1966, 70,358
Int. Cl. F16h 37/14
U.S. Cl. 74—674      6 Claims

ABSTRACT OF THE DISCLOSURE

This invention relates to a method and means for reversing the direction of rotation of the output shaft of an engine that has no gear box that incorporates reverse drive, the engine being provided with a supercharger compressor driven from a differential that includes a satellite-holder and planet wheels. The method of the invention consists in uncoupling the output shaft from the satellite-holder braking the rotary movement of the satellite-holder and coupling the planet wheel to the engine shaft. In carrying the invention into effect first and second coupling/uncoupling means are provided respectively between the engine shaft and the satellite-holder and between the engine shaft and the planet wheels; the second means being operative in at least one direction of rotation: a brake member is also provided for braking the satellite-holder.

The present invention relates to heat engines provided with a supercharged compressor driven by a differential drive. When these engines are provided with a gear box having at least one forward drive ratio and one reverse drive ratio, the direction of rotation of the drive shaft can be reversed without difficulty, as is known.

It is an object of the invention to provide an arrangement in which the direction of rotation of the output shaft of an engine of this type can be reversed without it being necessary to use a gear box embodying reverse drive.

In a method according to the invention, in order to obtain the desired reversal, the engine shaft is uncoupled from the satellite-holder of the differential drive train of the compressor, the rotational movement of said satellite-holder is braked and the toothed planet wheel is coupled to the engine shaft.

The invention also relates to apparatus for carrying out this method and comprises, in combination, a first coupling and uncoupling means between the engine shaft and the satellite-holder of the differential drive train of the compressor, a second coupling and uncoupling means, operative in at least one direction of rotation, between the engine shaft and the toothed planet wheel of said differential train, and a brake member associated with the satellite-holder of said differential train.

Figure 1:
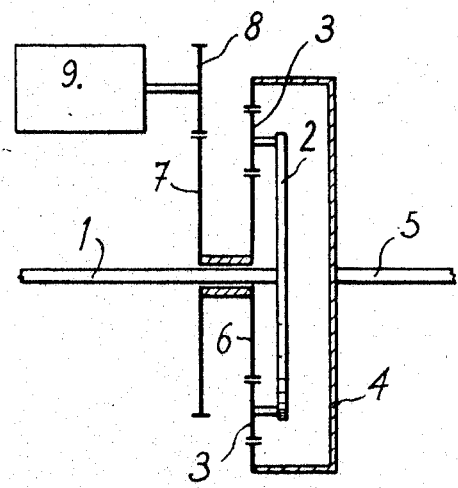
Figure 2:
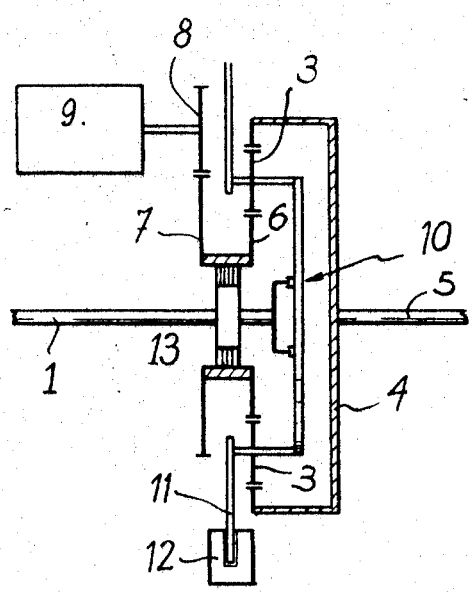

The invention will be more readily understood with the aid of the following description given solely by way of example, during which secondary characteristics as well as the advantages of the invention will appear. However, before describing an embodiment of the invention taken as an example, the constitution of a conventional differential drive of a supercharger compressor for an engine will be briefly described as is known up to the present time. Reference will also be made to the accompanying drawings in which:

FIGURE 1 shows a schematic representation of a conventional mode of differential drive for the supercharger compressor of an engine, and FIGURE 2 shows a schematic representation of a reversing device according to the invention incorporated with the differential drive of the supercharger compressor of a motor.

Referring now to the drawings, in FIGURE 1, the output shaft 1 of an engine (not shown) is permanently coupled to a satellite-holder 2 of a differential transmission which is, in this non-limiting example, an epicyclic train. The satellites 3 engage with an internally toothed ring or drum 4, fixed to an output shaft 5, and with a toothed planet wheel 6. The latter is free to rotate on the shaft 1 and it forms an integral part with a second gear 7 which engages with a pinion 8. The latter is fixed to the shaft of a supercharger compressor 9. With this conventional assembly, the direction of rotation of the shaft 5 can only be reversed by means of a gear box (not shown), located after the toothed ring or drum 4, and comprising at least one forward drive ratio and one reverse drive ratio.

FIGURE 2 shows a differential transmission similar to that of FIGURE 1 but incorporating a device according to the invention.

In the two figures, like members have been designated by like reference numerals.

In FIGURE 2, the shaft 1 of the engine is connected to the satellite-holder 2 by a coupling and uncoupling means designated by the general reference 10 and constituted in this embodiment by a direct drive dog-clutch device which may be moved axially on the shaft 1.

The satellite-holder 2 is securely fixed to a disc, which, during its rotation, moves between the shoes of a brake device 12. It will be noted that any other known braking means which can act, as desired, on the satellite-holder 2, could be used.

The torque produced by the gears 6–7 is connected to the shaft 1 by a coupling and uncoupling means, at least in one direction of rotation. This means may, as shown, comprise a free wheel 13 which enables the gears 6–7 to rotate faster than the shaft 1 but which acts as a positive coupling when the shaft 1 tends to rotate more quickly than the gear 6–7. This same means could also be a second direct drive dog-clutch device which would be displaced at the desired moment.

In operation, using the device of the invention, the direction of rotation of the shaft 5 may be reversed without the latter being provided with a gear box; at the same time, the compressor 9 is continuously driven in the normal running direction.

For this purpose, the engine shaft 1 is uncoupled from the satellite-holder 2 of the epicyclic train by displacing the direct drive dog-clutch wheel 10, and the rotary movement of the disc 11, and consequently the satellite-holder 2 is braked with the aid of the brake 12. At this moment, the shaft 1 which continues to be rotated by the engine rotates more quickly than the gears 6–7 and, as has been said above, positively drives these latter in the same direction of rotation. As the satellite-holder 2 is immobilized by the brake 12, the pinions 3 rotate about their immobilized axes so that the toothed ring or drum 4, and consequently the shaft 5, rotate in a direction opposite the initial direction of rotation.

The compressor 9 is not driven by the differential transmission but directly by the gear 7 and the pinion 8. This does not present any serious disadvantages in those cases where reverse drive is used only temporarily, such as for example in motor vehicles.

It will be apparent that various modifications may be made to the shape of the members and to their relative dispositions.

I claim:

1. A method of reversing the direction of rotation of the output shaft of an engine not provided with a gear box incorporating a reverse drive ratio and provided with a supercharger compressor with differential drive, including a satellite-holder and planet wheels, said method consisting in the steps of uncoupling said output shaft from said satellite-holder, braking the rotary movement of said satellite-holder and coupling said planet wheels to said engine shaft.

2. Apparatus for reversing the direction of rotation of the output shaft of an engine not provided with a gear box incorporating a reverse drive ratio and provided with a supercharger compressor with a differential drive having a satellite-holder and planet wheels, including a first coupling and uncoupling means between said engine shaft and said satellite-holder, a second coupling and uncoupling means operative in at least one direction of rotation, to couple and uncouple said engine shaft and said planet wheels and a brake member operable to brake said satellite-holder.

3. Apparatus according to claim 2, wherein said satellite-holder is fixed to a disc rotatable between shoes constituting said brake member.

4. Apparatus according to claim 2, wherein first coupling and uncoupling means is constituted by a direct drive dog-clutch device.

5. Apparatus according to claim 2, wherein said second coupling and uncoupling means is constituted by a direct drive dog-clutch device.

6. Apparatus according to claim 2, wherein the ratio between the speed of rotation of said planet wheel of said differential train and that of said engine shaft is higher than unity, and said second coupling and uncoupling means is constituted by a free wheel.

References Cited

UNITED STATES PATENTS

| 1,403,658 | 1/1922 | Zweigbergk | 192—3.6 X |
| 2,301,072 | 11/1942 | Hardone. | |
| 3,050,932 | 8/1962 | Mueller | 60—13 |
| 3,109,324 | 11/1963 | Loche | 74—674 X |

ARTHUR T. McKEON, Primary Examiner

U.S. Cl. X.R.

74—792